Oct. 11, 1955 R. H. ARRINGTON 2,720,070
FORAGE CROP CUTTING AND CONVEYING DEVICE
Filed Oct. 20, 1954 4 Sheets-Sheet 4
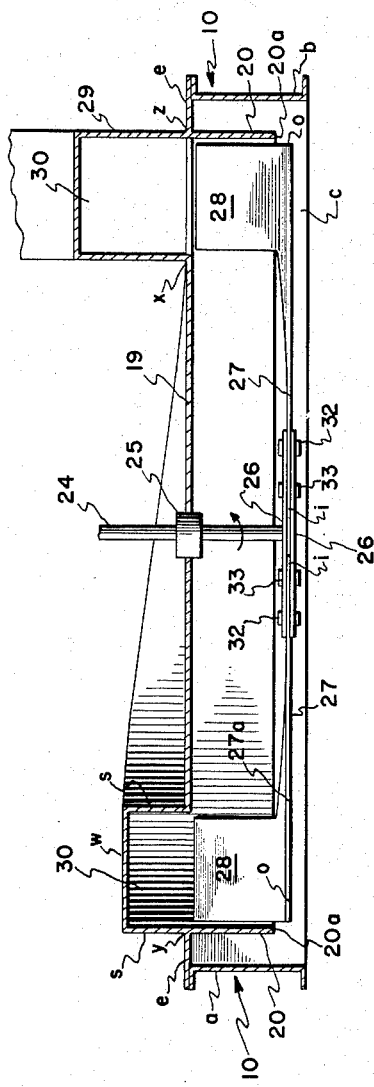
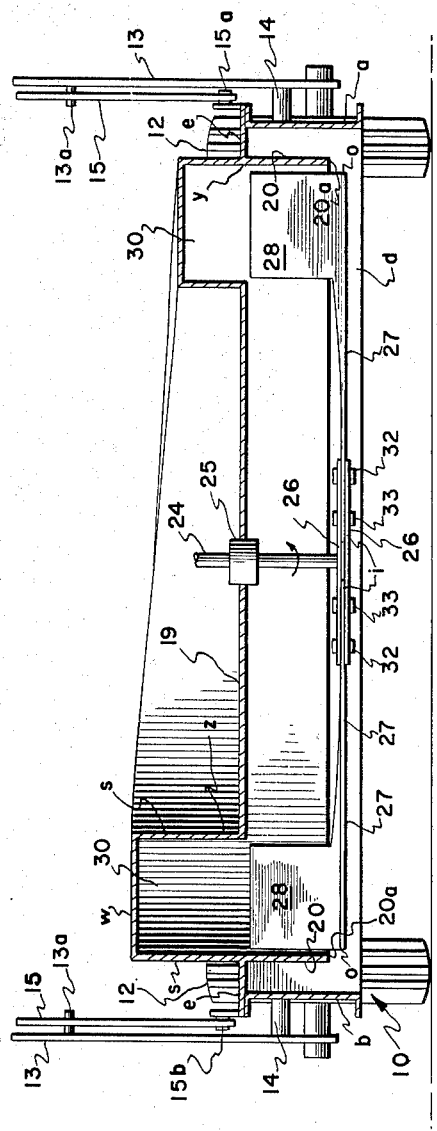
INVENTOR
RICHARD H. ARRINGTON
BY
ATTORNEY United States Patent Office 2,720,070
Patented Oct. 11, 1955

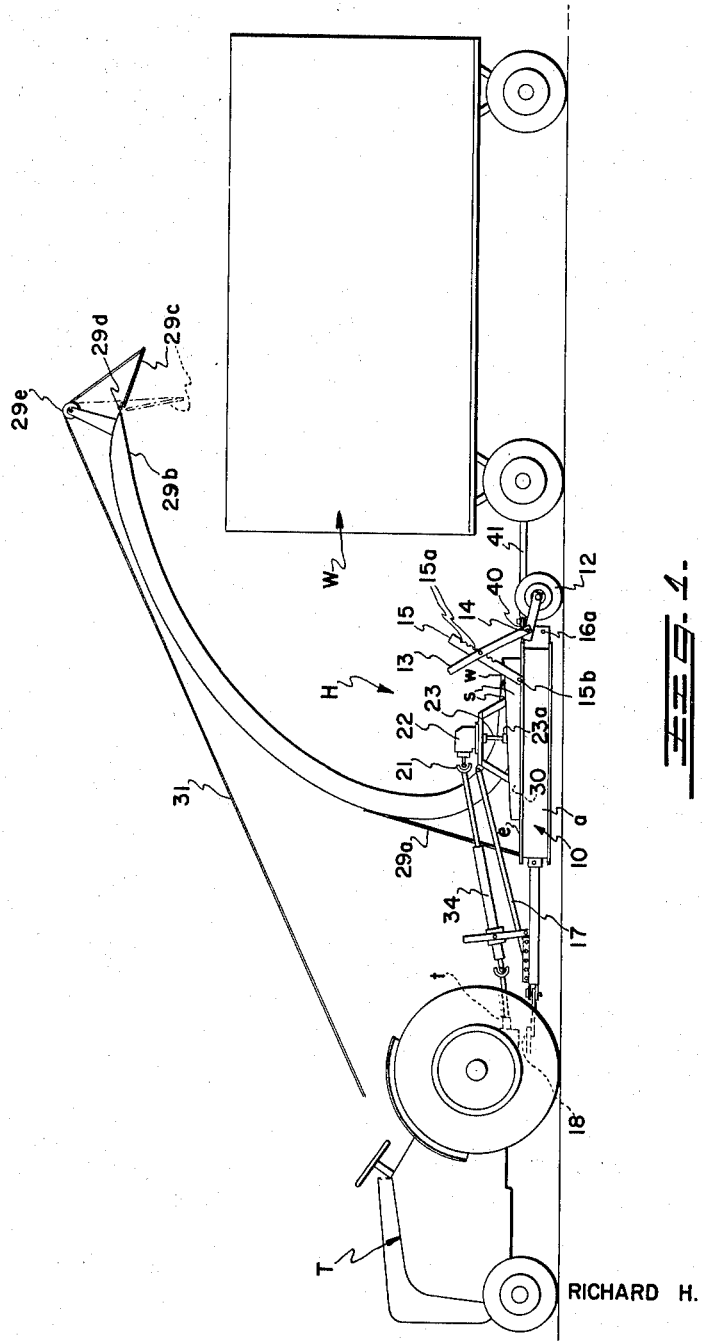

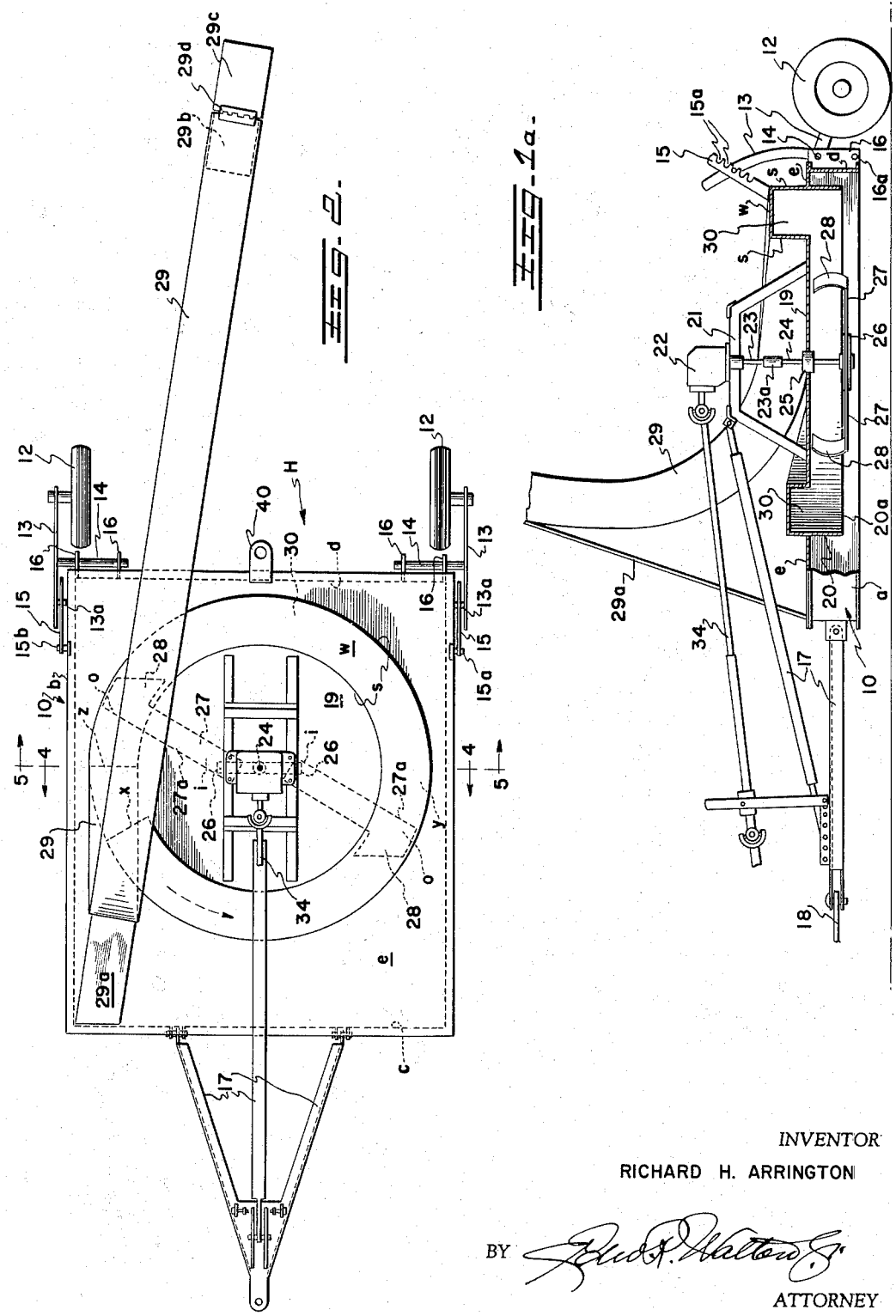

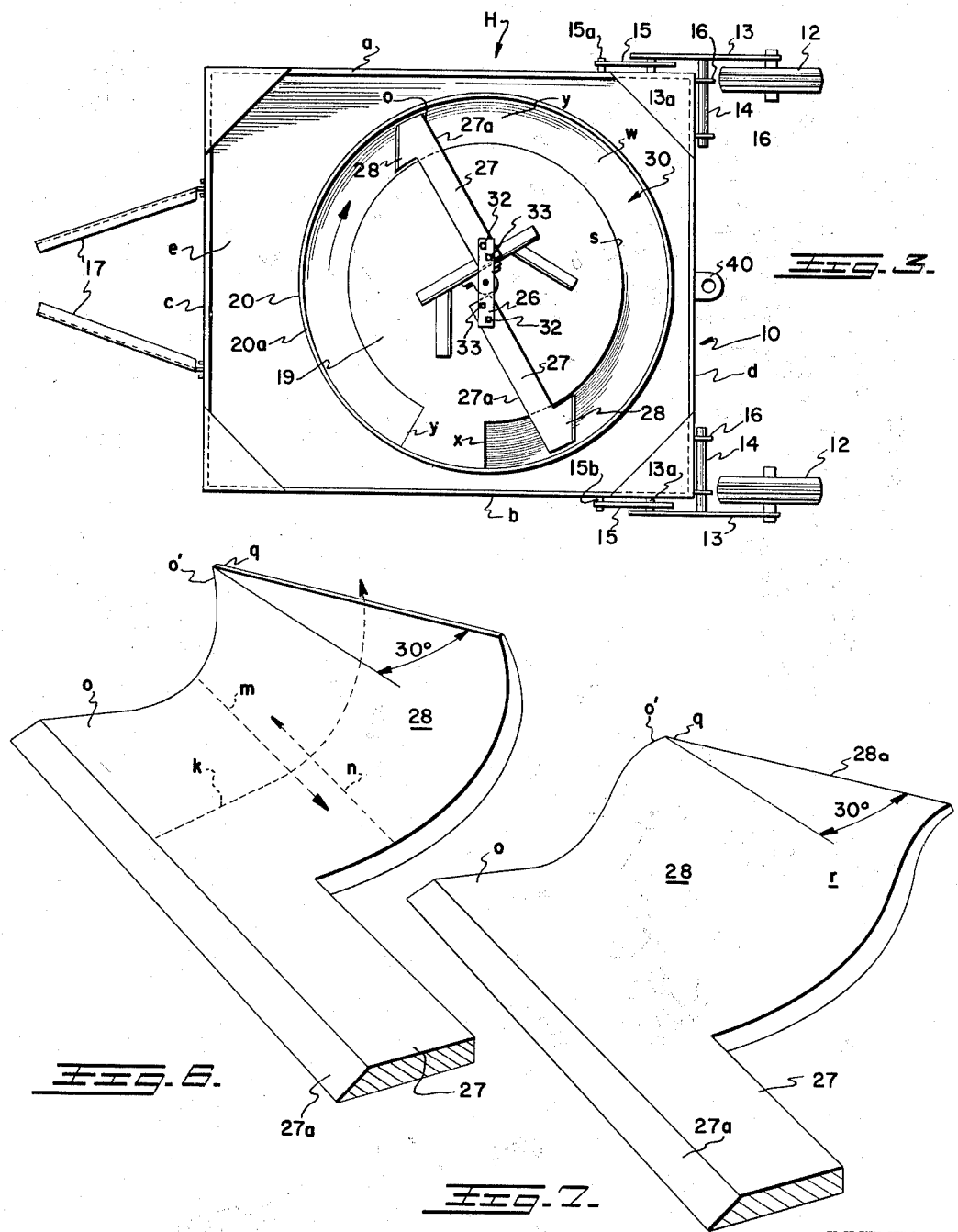

2,720,070

FORAGE CROP CUTTING AND CONVEYING DEVICE

Richard H. Arrington, Montgomery, Ala.

Application October 20, 1954, Serial No. 463,535

16 Claims. (Cl. 56—23)

This invention relates to harvester machines for cropping forage as silage.

There has always been a continuing and great need for a relatively inexpensive and simply constructed silage-crop harvester requiring a minimum of power for its operation and a minimum of maintenance. Cattlemen and dairymen are confronted each year with the problem of a surplus of forage growth (usually comprising a mixture of the heavier and coarser grasses, weeds, clover and the like or some of them) in rainy periods particularly in the spring seasons, which do not allow hay production. This surplus of forage becomes an economic loss due to the fact that heretofore there has been no economical and practical means for salvaging this crop as silage, except by relatively expensive, complicated and cumbersome forage harvesters requiring a large expenditure of power for their operation and undue maintenance which is not conducive to their acquisition especially for the comparatively small farmer.

The principal aim or object of the present invention is to overcome the above stated drawbacks by the provision of a relatively inexpensive silage harvester, having few operating parts including a rotary cutting-blade means arranged in a substantially horizontal cutting plane, which may be drawn and actuated by the usually two-row tractor (a common utility on most farms), the rotary blade means of which will generate an air current of great force to pneumatically convey this heavy coarse and moisture laden cut silage to a trailing wagon, or the like, also drawn by said tractor, while at the same time leaving sufficient forage for grazing purposes; this object or aim being accomplished with a small volume of air so that little, if any, negative air pressure is created under the harvester, which negative air pressure would entrain dirt or trash from the surface of the ground.

I have discovered that the aforesaid aim of the invention may be attained by a radial cutting-blade means rotatable about a generally vertical axis in association with an overlying circular hood-like casing open at its underside and concentric with the axis of the cutting blade means and provided with a circular-arc or substantially annular upwardly spiralling collecting passage overlying air impeller vanes extending upwardly from the outer ends of said cutting blades said vanes being of such configuration as to induce air current inwardly from the outer ends of the blades counter to those produced by centrifugal force, when the blades are rotated, and to direct said combined flows upwardly into said passage with a spiraling or cyclonic movement free of turbulence, whereby the heavy moisture laden cut material is entrained in said cyclonic current and floats from the cutting blades directly into said collecting passage and carried by said cyclonic current to a discharge duct directed into a trailing wagon or the like as the harvester progresses forward over a field of forage—all without any prohibitive amount of the cropped silage being thrown from the sides or underneath of the harvester or clogging said passage or duct or causing the entrainment of dirt or other trash from the surface of the ground, if operated in the recommended manner.

More specially the circular-arc spiral passage in the hood is in the form of an inverted channel having its inner side wall terminating above its outer side wall (which is the outer defining wall of the hood) and having the portion of its top confining wall, overlying the path of rotation of the impeller vanes, in the form of a gradual upward spiral, thus progressively increasing the vertical area of the channel in the direction of rotation of the impeller vanes. The portion of the smallest cross-sectional area of said channel is located at one side of the hood, with respect to its direction of travel, substantially opposite the axis of the blades and continues forwardly around the front of the hood and then rearwardly of the hood and, thence, forwardly to a point adjacent the commencing point where the channel rises from the top of the hood in a gradual upwardly and rearwardly extending arcuate tubular duct of such length and height as to direct the cut silage-crop into a trailing vehicle or container.

While the above are considered to be the salient features of this invention, other objects and novel features will become apparent from the following detailed description wherein the novel features of construction and the novel arrangement and combination of parts will be emphasized and particularly pointed out in the appended claims.

In order that a clearer understanding of the invention may be had, reference is made to the accompanying drawings which illustrate the form of the harvester as at present constructed and used and in which—

Figure 1 is a perspective view of the silage-crop harvester embodying the present invention, the harvester being shown connected to a two-row tractor which pulls it over a field and drives the cutting means thereof by means of a power take-off on the tractor, a trailer or wagon being entrained to the rear of the harvester into which the cut silage-crop is blown;

Figure 1a is a side view of the device with some of the parts shown in section.

Figure 2 is a top plan view of the harvester;

Figure 3 is an underside view of the harvester shown in Figure 2;

Figure 4 is a transverse sectional view taken substantially on line 4—4 of Figure 2;

Figure 5 is a transverse sectional view taken substantially on line 5—5 of Figure 2;

Figure 6 is a perspective view of an outer end of a cutting blade to illustrate the configuration of the air impeller vane thereon; and Figure 7 is a perspective view similar to Figure 6 of the modified form of the air impeller vane.

Referring in detail to the drawings, in which like characters of reference refer to similar and like parts throughout the several views, the harvester H of the present invention is hitched to and drawn over a field of forage growth by a tractor T having the usual power take-off $t$ operatively connected with the cutting mechanism of the harvester; and, to the rear of the harvester H, is hitched a trailing wagon or other suitable mobile container W into which the cut forage is blown from the harvester and collected for ensilaging (see Figure 1).

The harvester H preferably comprises a horizontal frame 10, substantially rectangular in shape (although it may be of any desired shape), which may compose, as shown, spaced side frame members $a$ and $b$, a front end member $c$, a rear end member $d$ and a top plate $e$ forming a platform supported by a pair of spaced traction wheels 12 positioned to follow behind the frame 10 at opposite sides thereof. The wheels 12 are mounted to the frame 10 so that said frame may be adjusted vertically to vary the distance of its underside relative to the ground surface; and, to this end, two brackets 13, in the form of bell-crank levers, may be disposed respectively at each rear end corner of the frame 10 and each secured to an arbor 14 at its fulcrum point, the rear end portion of each bracket 13 having a wheel 12 journalled thereto and having its other end portion provided with a lateral stud 13a selectively engageable with the toothed-rack 15a carried by a swing-link 15 pivoted at one end to a side of the frame 10. The arbors 14 may be selectively inserted in one of several vertically disposed bearing openings 16a in lugs 16 carried by the rear end frame member d so that, in conjunction with the link 15, a relatively wide variation may be obtained in the elevational adjustment of the frame 10. The front frame member c has secured thereto a suitable hitch means 17, preferably of the triangular three arm type, for connecting the harvester to the usual adjustable hitch-draft device 18 carried at the rear end of farm tractors T and which, by adjustment, will support the front end of the harvester at different elevated positions within the limits of its adjustment.

A central area 19 of the top plate or platform e is surrounded between the frame members a, b, c and d by a depending circular wall 20 laterally extending from its under face, which together with the central area 19, forms a hood-like casing open at its underside and overlying the cutting blades of the harvester. The lower edge of the circular wall 20 terminates a distance (i. e., about 2 inches to 3 inches above the lower edges of the frame members a, b, c and d) and is, preferably, reinforced by being thickened, or by the application of a coextensive band welded thereto or by flanging as generally indicated at 20a, in Figures 4 and 5.

Mounted on the top surface of the platform e, and overlying the central area 19, is a supporting frame 21 upon which a gear box 22 is detachably mounted with its output stub-shaft 23 positioned concentrically with respect to the circular hood-wall 20. A vertical shaft 24 extends from the stud-shaft 23 through a journal bearing 25, mounted in top-plate e of the frame 10 and concentric with the circular wall 20, and has its lower end projecting below the underside of the top plate e. The upper end of shaft 24 may be coupled with the stub-shaft 23 in any suitable manner as, for instance, by having an angularly faced end fitting into a complemental socket 23a in the end of the stub-shaft 23, as indicated, or by a sleeve coupling or in any conventional manner. The lower end of the shaft 24 is provided with at least two radial and oppositely extending arms 26 to each of which is removably secured the inner end of a cutting-blade 27, respectively.

Each cutting blade 27 comprises an elongated bar or strip of steel, whose thickness is a small fraction of its width, and has one of its elongated edges sharpened to provide a straight cutting-edge, as indicated at 27a, which forms the forward edge of the blade. The blades 27 are slightly twisted longitudinally from their outer ends o to their root or inner ends i so that the back edges of the blades are canted upwardly with respect to their straight cutting-edges 27a, the extent of this cant being greatest at the outer end of the blade in the amount of about 5° and progressively reducing toward the inner end i thereof. The length of the lower end of the shaft 24 is such as to position the cutting-edges 27a of the blades 27, connected thereto, to rotate in a plane preferably slightly below the lower edge 20a of the circular hood wall 20. In practice, it has been found that this spacing of the blades 27 below the hood edge 20a may be as much as ½ of an inch. When the blades 27 are below the edge 20a of the hood, the outer ends o of the blades 27 terminate preferably within an area defined by a vertical line projected from the lower end of the hood-wall 20.

Each blade 27 carries on its back edge of its outer end portion o, an air impeller vane 28 extending upwardly into the hood adjacent its depending wall 20 and for a distance substantially the length of said wall and being of a configuration which will induce an inward flow of air from the outer end o of the cutting blade 27 to counter currents or centrifugal forces created by the rapid rotation of the cutting-blades and which configuration will direct these combined currents upwardly and forward, with respect to the direction of rotation of the blades 27, in a constantly spiralling cyclonic movement about the circular wall 20 of the hood casing 19—20. The configuration of vanes 28, to produce this current flow in sufficient volume and force to float and convey the heavy and moisture laden forage cut by the blades 27, is that which may be generally described as substantially corresponding to a longitudinal section of a truncate hollow cone, as shown in Figure 6, with its arcuate end of less radius curving rearwardly and upwardly from the outer end o of the back edge of each blade 27 and increasing in radius progressively inwardly along the blade for a distance of about a quarter to a third of the length of the blade. This formation and disposition of each vane 28 positions the effective concaved surface of the vane at an inwardly facing oblique angle relative to its blade so that the outer edge o' of the vane will scoop or draw-in air that flows in the direction of the arrow m, Figure 6, when the blades 27 carrying the vanes are rotated. However, since the blades 27, when rotated about their axis 24, will develop and impart to the air and the cut material a centrifugal force moving in the direction of arrow n, Figure 6, the degree of oblique angularity of the vane should be great enough so that these two forces m and n are completely balanced so that the force p, produced by the canted outer portion of the blade and moving in the direction of the arrow p, will, together with the arcuate surface of the vane, deflect the air currents m and n upwardly and forwardly in a cyclonic stream about and within the wall 20 of the hood-casing 19—20. This angularity of the vanes 28 and the cant of the blades 27, in combination with the hood wall 20 and the overlying spiral collector passage 30, appears to be of importance in attaining the results sought and obtained by this invention.

I have found in a harvester machine of this invention, having each blade two feet in radius moving at 10,000 feet per minute and the vanes about 5 inches wide, the results sought are attained when the angulation of the vanes is approximately 30 degrees relative to a radius line from the axis of rotation to the point q of the vane. I also found that to materially increase the angularity of vanes beyond 30°, at the stated R. P. M., resulted in "sling-in" of said forces toward the center of the hood-casing 19—20, which hampers the efficiency of the machine as much of the cut material falls to the ground and the required air force to convey the cut-material to the attending collector wagon is lost. However, this degree of angulation may have to be varied should the harvester be made larger or smaller or designed to have the blades 27 and vanes 28 operated at a different speed than hereinafter recommended.

This configuration of the vanes shown in Figure 6 performs very satisfactorily with all type of forage, but, in cutting clover for silage, it is preferred to provide a rearwardly curved lip 28a along the upper marginal edge portion of the vane, by turning said marginal portion arcuately backward, as at r, resulting in the 28 being of a reverse curve formation as shown in Figure 7. The cut forage will flow over the smooth top surface of the lip 28a without clinging to the surface of the vane and said surface will also impart an upward movement to air slipping thereover or in its path of movement.

Furthermore, it has been found that, in order for the above mentioned cyclonic air stream produced by the vanes 28 and having the cut-forage entrained therewith to have the force necessary to convey and lift the cut-forage through the duct 29 to wagon W, a confining spiral passage of gradually increasing cross-sectional area is required so as (1) to accommodate the gradually increasing volume of the cropped forage from the point $x$ of effective cutting by the blade 27 to the end of said cutting at point $y$ (i. e., during the forward half of the cycle of rotation of each blade), (2) for the increasing air volume through the full cycle of rotation of the blades from point $x$ to discharge point $z$ and (3) to reduce turbulence to a minimum and generate an air current of the force necessary. This is accomplished by providing an inverted upwardly spiral channel 30 from the point $x$ to the point $z$ and immediately overlying the path of rotation of the vanes 28; and, to this end, the circular wall 20 and the marginal portion of the central area 19 of the top-plate $e$ is extended upwardly above the top surface of plate $e$ to form the side walls $s$ of the channel having their vertical height increasing progressively from point $x$ to point $z$ in the direction of rotation of the vanes 28, as shown by the arrow in Figure 2. The side walls $s$ of the channel are closed by a top wall $w$ which forms the bottom of the inverted channel. The height of walls $s$ starts at zero and progressively increases from point $x$ to about 6 inches at point $z$ where the larger end of the channel 30 discharges upwardly therefrom into the lower end of an arcuate duct 29 connected thereto and which duct extends upwardly and rearwardly of the harvester H to overlie the body of the trailing collector wagon W. It will be thus seen that the spiral channel 30 is substantially annular or, more correctly, a circular-arc in form.

The duct 29 is suitably braced as at $29^a$ and has its upper end formed with a downwardly directed discharge opening $29^b$ controlled by a deflector $29^c$ hinged to the rear side of the discharge opening $29^b$, by means of a spring hinge $29^d$, and is normally biased thereby toward said opening $29^b$. The deflector may be moved against the bias of said hinge, to the extent desired for directing the discharged material into the wagon W, by means of a pull cable 31 connected to the distal end of the deflector $29^c$ and extending over guide means $29^e$ to a convenient location on the tractor within reach of the operator thereof.

The cutting blades 27 are connected respectively at their inner ends $i$ to one of the arms 26 on the shaft 24 by means of bolts 32 and 33, the bolt 32 being of smaller diameter than bolt 33 so that, should the blades 27 strike a stone or stump, the bolt 32 will shear and cause the blade to swing back on bolt 33, thus avoiding injury to the shaft or other operating parts and prevent the blade 27 from being thrown against the hood casing.

It will also be observed that the hood casing 19—20 is positioned well within the confines of the frame members $a$, $b$, $c$ and $d$, and that its lower edge $20^a$ and the cutting blades 27 lie a substantial distance above the lower edges of said frame members $a$, $b$, $c$ and $d$ in order that said members will act as a shielding protecting guard against objects, such as stones, sticks and the like, being thrown outwardly from underneath the frame 10 by the centrifugal force of the cutting blades, said objects being many times heavier than the forage being cut and not influenced by the inward suction of the vanes described above.

I have found that the rotary blades 27 must have a circumferential or tip end speed of at least 8,000 feet per minute in order to properly cut and to create air currents of sufficient force to lift and convey the cut forage into trailing wagon W. A speed of 10,000 feet per minute is preferable regardless of the radius of the blades 27 and can be attained from the usual power take-off $t$ of the tractor T (which has a take-off speed of about 525 R. P. M.) through a shaft 34 connected with the gear box 22 having the required gear ratio. The effective cutting area of the blades 27 is at their tip or outer ends $o$ and may extend inwardly of the blades for about one-quarter to one-third the length of each; and the effective cutting of the forage occurs in the front half of the cycle of rotation of the blades, with respect to the forward movement of the harvester over a field—that is, from point $x$ to $y$ corresponding to their direction of rotation.

The machine of this invention is designed to harvest crops planted specifically for silage, such as oats and other small grains, sorghum and the like, as well as the usual forage or pasture growths and, therefor, may be operated from about 3 inches or less to about 12 inches or more above the surface of the ground surface of the field with equal facility and efficiency. In many instances where clover is interplanted with oats or other small grains, it is desirable to adjust the hitch 17 and the wheel brackets 13 to elevate the harvester to eight or ten inches above the ground so that the oats or such small grain growth, along with the taller weeds and grasses, may be cropped for silage leaving the clover and the shorter grasses and the like for pasture grazing.

In the use of the harvester H, its frame 10 may be level or parallel with the ground surface over which it moves or with its rear end slightly higher than its front end. The explanation of this appears to be: While the vanes 28 are generating the cyclonic whirling air current during the effective cutting action of the blade 27 from points $x$ to $y$, the vanes 28 in the back half of their cycle of rotation induce or scoop-up air in greater volume and impart greater force thereto in the portion of the collecting channel 30 of larger cross-sectional area between points $y$ and $z$ which is not accomplished as efficiently during the effective cutting portion of the cycle of the cutting blades 27 between points $x$ and $y$; and by having the frame 10 level with the ground or upwardly tilted at its rear end, the action of the vanes 28 seem to be assisted and removes any tendency of the cut forage, particularly if wet, from adhering to the walls of the collecting channel 30 or at its juncture with the duct 29.

A harvester constructed in accordance with the above, and with the two blades 27 each being 2 feet in length, has actually produced 10 tons of silage crop per hour including time wasted when swinging out to turn corners of the field, and in changing wagons W, and, further, considering that the height and thickness of the forage crop in the field was not uniform. The wagon W will contain about five tons of cut forage and, when filled, is unhitched from the harvester and replaced with another, the contents thereof being drawn to a silo and ensilaged.

It should be manifest that the novel silage crop harvester of the type above described attains the objects above set forth with a very simple and inexpensive mechanism requiring a minimum of maintenance and power for its operation and that the pneumatic collecting and conveying of the cut forage is accomplished by the movement of the cutting blade having air current generating vanes thereon in a novel combination with a spiral collecting channel. If the harvester is made on a larger scale to cut a wider swathe, there should be three or four blades 27 of increased length but their optimum tip speed of 10,000 feet per minute should be maintained, although the spiral collecting channel 30 and the impeller vane 28 will require a corresponding increase in their sizes.

Having thus described my invention in the manner in which the same is to be attained and performed, it is manifest that certain modifications and variations may be made in the exact construction herein described and shown and, therefore, it is to be understood that the invention is only to be limited by the scope of the appended claims.

That which is claimed as new and upon which Letters Patent are to be secured, is:

1. In a mobile harvester of the type adapted to be drawn over a field of forage to crop and pneumatically discharge the same into a trailing wagon as silage, a horizontal supporting platform having front and rear ends and having downwardly directed members framing said platform, vertically adjustable supporting traction wheels for said platform, a forage cropping and conveying means mounted on said platform, said means including horizontally disposed cutting blades mounted to rotate in a plane between and above the lower edges of said framing members, a circular wall depending from said platform and concentrically overlying said blades at their outer ends and terminating above the plane of rotation of said blades, air impeller vanes projecting upwardly from the outer end portions of said blades into the area defined by said circular wall and each having its vertical portion oblique relative to the radius of its blade with its outer edge forward of its inner edge, a spiral-form channel passage supported on the top surface of said platform and overlying the path of rotation of the vanes and open along its underside to communicate therewith and terminating at its larger end in a curved duct rising from said platform and directed to discharge into a trailing wagon, a driving means supported on the top surface of said platform.

2. A harvester for cutting and pneumatically conveying and discharging therefrom relatively heavy and moisture laden forage into a trailing collecting vehicle, said harvester comprising an ambulatory vertically adjustable frame, a circular hood-like casing carried by said frame and open at its underside, radially disposed cutting blades positioned under said casing and mounted on an axis concentric with said casing in a plane substantially at the lower edge of said casing, an air impeller vane carried by each blade at its outer end portion and extending arcuately upward therefrom into the casing in close proximity to the side wall thereof and with its concave surface facing forwardly at an oblique angularity radially inward relative to its direction of rotation, a circular-form inverted channel on and opening into said casing and overlying the path of rotation of said vanes, said channel having a discharge opening at one end positioned at one side portion of the casing and progressively reducing in height around said casing, in a direction counter to the rotation of said blades, to approximately the plane of rotation of the top edges of said vanes at a point located adjacent its said discharge end, an upwardly directed duct extending from the discharge end of said channel to convey the cut silage to a trailing wagon, and driving means mounted on said frame having an operative connection with said blade.

3. A harvester for cutting and pneumatically conveying and discharging therefrom relatively heavy and moisture laden forage to an attending ambulatory collecting receptacle, said harvester comprising an ambulatory vertically adjustable hood-like casing having its lower portion formed by a circular wall open at its underside, elongated blades positioned under and rotatably mounted radially on an axis substantially concentric with said wall of said casing and having their cutting edges in a plane below the lower edge of said circular wall, the cutting edges of said blades being their forward edges with respect to their direction of rotation, an air impeller vane following each blade at its outer end portion and extending upwardly into the hood-casing and having its outer end in close proximity to the circular side wall of said casing, said impeller vanes each being shaped to induce a current of air inwardly from the outer ends of combined flows of forces upwardly and forwardly of said blade, when said blades are rotating, and to direct said combine flows of forces upwardly and forwardly of said vanes and producing a cyclonic air current whirling upwardly and about said side wall of said casing in the direction of rotation of said vanes, and an inverted circular-arc channel formed on said hood casing and opening into said casing and overlying the greater portion of the path of rotation of said vanes, said channel progressively increasing in height forwardly of the harvester and with respect to the direction of the rotation of said blades from a point at a side portion of said frame to a point adjacent said point of beginning, where said channel emerges from the hood casing in the form of a conveying duct, and means for rotating said blades and vanes.

4. In a mobile harvester of the type adapted to be moved over a field of forage to crop the same for silage, a hood-like casing having a vertical circular wall, cutting blades having their cutting edges disposed slightly below said wall and mounted on the harvester for rotation substantially concentric with said wall, an arcuate vane carried by each blade and extending upwardly into said casing with its concaved surface facing forwardly at an oblique angle inwardly with respect to the direction of rotation of said vanes to induce forces counter to centrifugal forces, a collecting channel on the casing overlying and open at its underside to communicate with the path of rotation of said vanes within said casing, said channel having an upwardly spiralling upper wall, the lower end of said spiral wall being positioned at one side of a fore-and-aft longitudinal line through the center of and casing and gradually rising therefrom in height forwardly and around said casing in a direction corresponding with the direction of rotation of said vanes and terminating in a discharge opening at a point on the same side of said line as the lower end of said upper wall of said channel, and means for rotating said blades.

5. The subject matter of claim 4 wherein there are shielding side walls surrounding and outwardly spaced from the lower portion of said casing and extending below the lower edge of said casing.

6. In a mobile harvester of the type adapted to be moved over a field of forage to crop the same for silage, a hood-like casing having a depending circular wall, cutting blades disposed beneath said casing and mounted for rotation substantially concentrically with said wall in a substantially horizontal plane, an arcuate vane following each blade and extending upwardly into said casing with its concaved surface facing forward with respect to the direction of rotation of said vanes and shaped to induce a current of air inwardly from the outer end of its blade, a circular arc inverted channel closely overlying and open to the greater portion of the path of rotation of said vanes and progressively increasing in height around the casing, relative to the rotation of said blades, from a point at one side of the harvester to a point adjacent the commencing point, and a conveying duct connected with the larger end of said channel.

7. The subject matter of claim 6 wherein there is a lip extension along the upper edge of each vane extending upwardly rearwardly therefrom.

8. A harvester adapted to be drawn over a field for cutting and pneumatically conveying and discharging therefrom relatively heavy and moisture laden forage into a collecting receptacle as silage, and said harvester comprising a mobile body frame carrying a casing having its underside open and defined by a substantially vertical circular wall, rotatable cutting blades radially mounted on an axis substantially concentric with said wall in a plane substantially at the lower edge of said wall, an air impeller vane on the back edge of the outer end of each blade with respect to the direction of rotation of said blades and extending arcuately therefrom upwardly and forwardly into said casing adjacent the circular wall thereof, said vanes each being in the form of a segment of a hollow truncated cone with its portion of less radius outermost of its blade and increasing in radius inwardly along the back edge of the blade for a distance thereof, means providing a circular-form spiralling passage in said casing overlying the path of rotation of said vanes and open at its underside and having a discharge opening at its larger end positioned at one side of said frame, said passage gradually reducing in height from said opening counter to the rotation of said vanes to a zero height at a point adjacent said discharge opening, duct means rising from said frame and connected with discharge opening of said passage to convey the pneumatically entrained cut silage to a collecting receptacle, and power transmission means on said frame for rotating said blades.

9. A harvester for cutting and pneumatically conveying and discharging therefrom relatively heavy and moisture laden forage into collecting receptacle for ensilaging, said harvester comprising an ambulatory platform, rotatable cutting blades underlying said platform and radially disposed on an axis carried by said platform, a circular wall depending from said platform concentrically with said blades and terminating substantially at the plane of rotation of said blades, said blades having forward cutting edges with respect to their direction of rotation, an air impeller vane following behind each blade at its outer end and extending arcuately upward therefrom into the area defined by said circular wall and with its concaved surface facing forward relative to their direction of rotation, thereby to induce and direct air current forwardly and upwardly of said blades, when said blades are rotated, producing a cyclonic upwardly whirling fluid flow about said circular side wall in the direction of rotation of said vanes with the cut-forage entrained therein, and an inverted channel carried by said platform and overlying at least the greater portion of the path of rotation of said vanes, said channel progressively increasing in height from and to a point in its circumference in the direction of the rotation of said blades, the portion of said channel of greater cross-sectional area emerging upwardly from said platform in an upwardly extending arcuate duct, and drive means for rotating said cutting blades and vanes.

10. The subject-matter of claim 6, wherein shielding members depend from said platform for a distance below and surrounding said circular wall in spaced relation to said wall.

11. A harvester, for cutting and pneumatically conveying and discharging therefrom relatively heavy and moisture laden forage into collecting receptacle for ensilaging, comprising an ambulatory platform, cutting blade underlying said platform and radially disposed about a rotatable vertical shaft journalled on said platform, a circular wall depending from said platform concentrically with said blade and terminating substantially at the plane of rotation of said blades, said blades each having a cutting edge on its forward longitudinal edge relative to its direction of rotation and having its rear edge canted slightly upwardly from its outer end inwardly, an air impeller vane carried by each blade at the outer end of its rear edge and extending upwardly into the confines of and adjacent to said circular wall, said impeller vanes each being arcuate with its concaved surface facing forwardly with respect to its direction of rotation and having its arc of gradually increasing radius from its outer end inwardly of said blade, a circular-form inverted channel carried by the platform and overlying the path of rotation of said vanes, said channel progressively increasing in height from and to a point in its circumference in the direction of the rotation of said blades, the portion of said channel of greater cross sectional area emerging upwardly from the platform in an upwardly extending rearwardly directed arcuate duct, and means for driving said shaft.

12. The subject matter of claim 11 wherein the top edge portion of each of said vanes is a rearwardly directed lip formed on a reversing curve with respect to the body of the vane.

13. In a silage harvester for cropping forage growth and conveying the same pneumatically to an attending receiving vehicle as the harvester progresses over a field, the combination of means defining a substantially annular passage spirally overlying radial cutting blades rotatable in a plane substantially normal to the axis of said passage, said passage being open at its underside and having its side walls terminating above at least the plane of rotation of the cutting edges of said blades, an air impeller vane on each blade projecting from a rear portion of said blade upwardly toward and underlying said passage, each vane being arcuate with its concaved surface facing forwardly of the direction of rotation thereof with its upper portion angled sufficiently with respect to a radial line from its axis of rotation to the outer edge thereof to induce air current inwardly from the outer end of said vane counter to centrifugal air currents produced by said blade, when rotated, whereby said combined air currents, together with air currents generated by the blades in their area forward of their respective vanes, are directed upwardly into said passage with an upwardly spiralling cyclonic movement entraining the cropped material upwardly into said passage and with sufficient force to deliver the same to an attending collection vehicle, and means for rotating said blades.

14. In a silage harvester for cropping forage growth and conveying the same pneumatically to an attending receiving vehicle as the harvester progresses over a field, the combination of means defining a substantially annular passage spirally overlying radial cutting blades rotatable in a plane substantially normal to the axis of said passage and having an open bottom-side, an air impeller vane on each blade projecting upwardly toward and underlying said passage, each vane being arcuate with its concaved surface facing forwardly of the direction of rotation thereof with its upper portion angled at approximately 30° with respect to a radial line from the axis of rotation thereof, the apex of said angle being at the outer end of said vane relative to the length of said blade, whereby to generate air currents inwardly of the outer edge of the vane counter to forces moving outwardly of said blades and to direct said combined air currents upwardly into said passage with an upwardly spiralling cyclonic movement entraining the cropped material upwardly into said passage and with sufficient force to deliver the same to an attending collection vehicle, duct means connected with said passage to convey the entrained cut material to said vehicle, and means for rotating said blades.

15. In a silage harvester for cropping forage growth and conveying the same pneumatically to an attending receiving vehicle as the harvester progresses over a field, the combination of means defining a substantially annular passage having an open bottom side and spirally overlying the outer end portions of radial cutting blades rotatable in a plane substantially normal to the axis of said passage and slightly below the lower edge of said passage, the outer rear edges of said blades with respect to their direction of rotation being canted upwardly, an air impeller vane projecting upwardly from the rear edge of each blade at its outer end portion and underlying and extending across the open bottom-side of said passage, each vane being arcuate with its concaved surface facing forwardly with respect to its direction of rotation and gradually increasing in radius from its outer end with its upper edge angled at approximately 30° with respect to a radial line from its axis of rotation thereof to its outer edge, whereby to generate air currents inwardly of the outer edge of the vane counter to centrifugal currents moving outwardly of said blades and to direct said combined air currents upwardly into said passage with an upwardly spiralling cyclonic movement entraining the cropped material upwardly into said passage and with sufficient force to deliver the same to an attending collection vehicle, duct means connected with said passage to convey the entrained cut material to said vehicle, and means for rotating said blades.

16. In a silage harvester for cropping forage growth and conveying the same pneumatically to an attending receiving vehicle as the harvester progresses over a field, the combination of means defining an upwardly rising spiral form passage overlying the outer end portions of elongated and radial disposed cutting blades rotatable in a plane substantially normal to the axis of said passage the lower edge of the outer wall of said passage being in a plane substantially parallel to the plane of rotation of said blades and slightly above at least the cutting edges of said blades, each blade having elongated longitudinal edges one forming a front cutting edge, the outer end portions of said blades being canted transversely and upwardly with respect to their front cutting edges, an air impeller vane projecting upwardly from the rear edge of each blade at its outer end portion and underlying and extending across said passage, each vane being arcuate with its concaved surface facing forwardly with respect to its direction of rotation and of gradually increasing radius from its outer end with its upper portion angled sufficiently with respect to a radial line from its axis of rotation to the outer edge thereof to induce air currents inwardly from the outer end of said vane counter to centrifugal air currents produced by said blades, when rotated, whereby said combined air currents, together with air currents generated by said blades in their areas forward of their respective vanes, are directed upwardly into said passage with an upwardly spiralling cyclonic movement entraining the cropped material upwardly into said passage and with sufficient force to deliver the same to an attending collection vehicle, duct means connected with said passage to convey the entrained cut-material to said vehicle, and means for rotating said blades.

References Cited in the file of this patent

UNITED STATES PATENTS

| | | |
|---|---|---|
| 1,656,105 | Durkee | Jan. 10, 1928 |
| 2,071,872 | Cockburn | Feb. 23, 1937 |
| 2,477,795 | Gehl | Aug. 2, 1949 |
| 2,661,585 | Hansen | Dec. 8, 1953 |
| 2,675,661 | Titzer | Apr. 20, 1954 |
| 2,701,942 | Caldwell, Jr., et al. | Feb. 15, 1955 |